May 9, 1939.  J. B. ARMITAGE  2,157,471

MACHINE TOOL

Filed Oct. 30, 1935  7 Sheets-Sheet 2

INVENTOR
Joseph B Armitage
BY
Fred G Parsons
ATTORNEY

May 9, 1939.  J. B. ARMITAGE  2,157,471
MACHINE TOOL
Filed Oct. 30, 1935  7 Sheets-Sheet 5

INVENTOR
Joseph B Armitage
By Fred G Parsons
ATTORNEY

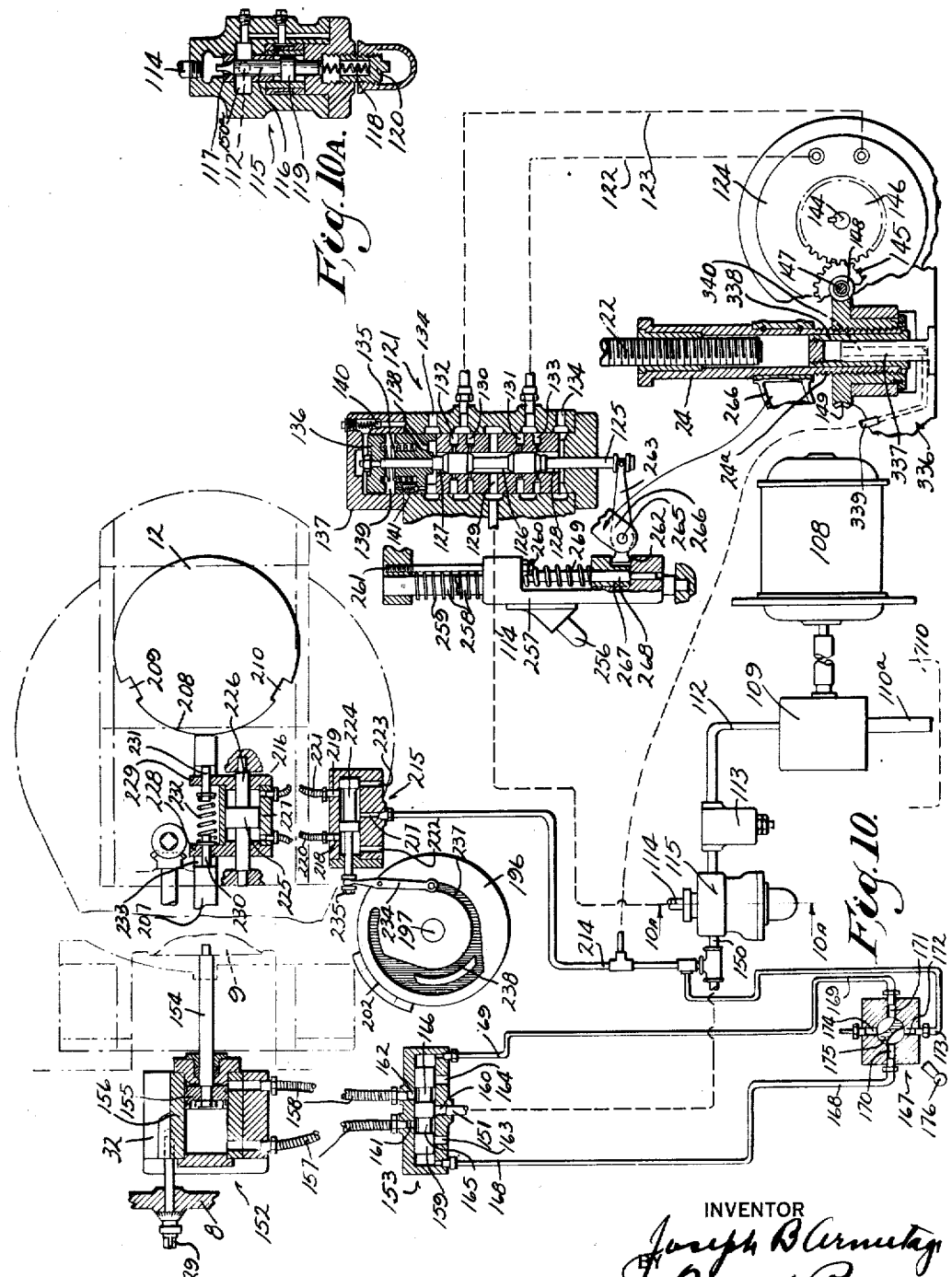

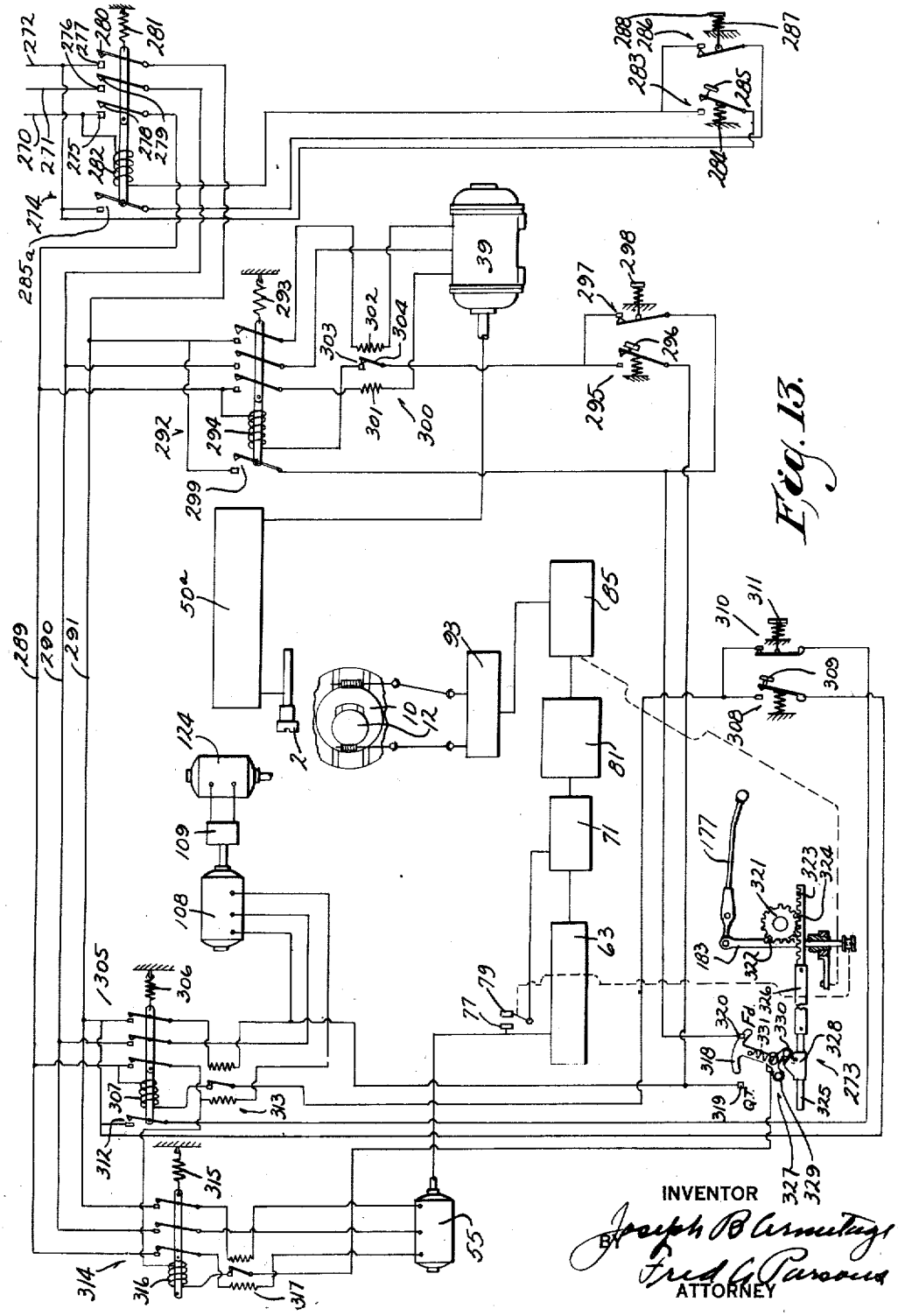

Patented May 9, 1939

2,157,471

UNITED STATES PATENT OFFICE 2,157,471

MACHINE TOOL

Joseph B. Armitage, Wauwatosa, Wis., assignor to Kearney & Trecker Corporation, West Allis, Wis., a corporation of Wisconsin Application October 30, 1935, Serial No. 47,345

42 Claims. (Cl. 90—13.7)

This invention relates to machine tools and more especially to transmission and control mechanism therefor.

A purpose of the invention is to provide an improved machine tool having a plurality of transmission mechanisms for different slides or supports, together with improved control mechanism for determining the combined operating effect of the transmission mechanisms, the apparatus being particularly adapted for a milling machine.

Another purpose is to provide a machine tool with improved control mechanism for effecting a cycle of movement including movement of a plurality of slides, and determinative of the relative time and extent of movement of each slide, and particularly where the machine is a milling machine.

Further purposes are to provide a machine tool having relatively movable tool and work supports together with improved transmission and control mechanism therefor in which the rate and extent of relative movement is determined by a tracer or follower operating against a master cam or pattern, and particularly in a milling machine.

A further purpose is to provide an improved machine tool having a tracer controlled movement, and another movement, each controlled to effect a machine cycle including a predetermined sequence or relationship of both movements, and especially in a milling machine.

A further purpose is to provide an improved machine tool for effecting predetermined relative movements of a work piece and tool in one path, together with simultaneous tracer controlled movements thereof in another path, and particularly for milling formed surfaces.

Further purposes are to provide an improved machine tool having transmission mechanism for a variety of movements, and improved control mechanism therefor, which is in part electrical, in part mechanical, and in part hydraulic, and particularly in a milling machine.

A further purpose is to provide transmission, and control mechanism for a variety of movements with improved means limiting the operation thereof in a preferred manner, and particularly for a plurality of machine tool supports driven by means of individual motors.

A further purpose is to provide an improved hydraulically actuated tracer control mechanism for a machine tool.

A further purpose is to simplify and improve the construction and operation of machine tools generally, both of the machine as a whole and of its various component parts and their relationship, and still other purposes will be apparent from the following parts of this specification.

The invention consists in the construction and relationship of parts as herein illustrated, described and claimed, and in such modifications of the structure illustrated and described as may be equivalent to and come within the spirit and scope of the claims.

Throughout the specification like reference characters refer to the same parts, and in the drawings:

Fig. 7 is an enlarged view in vertical section taken along line 7—7 of Fig. 1.

Fig. 8 is a partial view in vertical section taken along line 8—8 of Fig. 3.

Fig. 9 is a partial view in horizontal section taken along line 9—9 of Fig. 8.

Fig. 10 is a semi-diagrammatic development of certain hydraulic transmission and control mechanism of the machine.

Fig. 10a is an enlarged view in section of a valve taken along line 10a—10a of Fig. 10.

Fig. 11 is a semi-diagrammatic expanded view of certain control mechanism of the machine.

Fig. 12 is a partial view in section taken along line 12—12 of Fig. 2.

Fig. 13 is a diagrammatic view illustrating certain interconnections and relationships between some of the driving and controlling mechanisms, particularly the several motors of the machine.

Fig. 14 is a front view of the arrangement of a control box or unit shown in Fig. 1.

Figs. 15, 16, 17 are projected views of a work piece.

Figure 1:
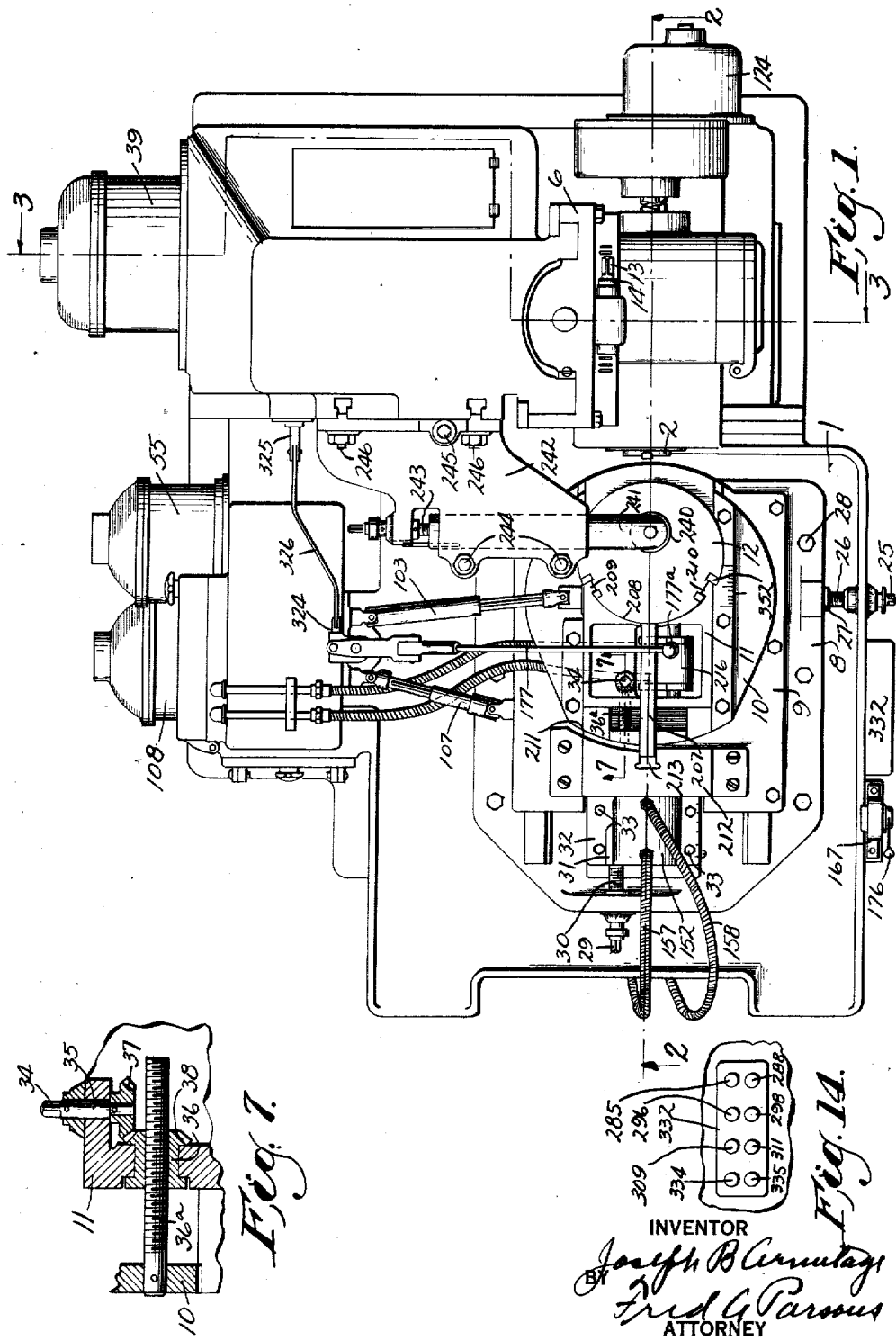
Fig. 1 is a plan view of a milling machine incorporating the invention shown with certain covers removed to better disclose the internal mechanism.

The machine shown in the drawings is a milling machine which includes a base 1 having a tool spindle 2 rotatably supported thereon.

The spindle 2, is axially movable by reason of being rotatably carried within a quill member 3, which is slidably mounted in a support 4 pivoted for angular adjustment of the spindle about a pivot point 5, the support 4, being carried by a support 6, which is vertically movable on suitable guideways on an upstanding column or support 7 fixed with base 1.

The machine also includes a number of superimposed movable work supports including a support 8, guided on base 1, for horizontal movement transverse to the axis of spindle 2, a support 9 guided on support 8 for horizontal movement parallel to the vertical plane of the spindle axis, a support or table 10 rotatably mounted on support 9, a support 11 guided for horizontal movement on support 10, and a support or table 12 rotatably mounted on support 11.

The spindle quill 3 is prevented from rotating and provides annular bearings for spindle 2 of any suitable form arranged to prevent relative axial movement of the spindle and the quill. Suitable means, not shown, are provided for endwise bodily manual adjustment of the quill 3 relative to support 4, as for instance the adjusting means shown in Patent No. 1,967,733, issued July 24, 1934. Suitable clamp means, not shown, are provided for fixing the quill 3 in any of its adjusted positions.

Figure 2:
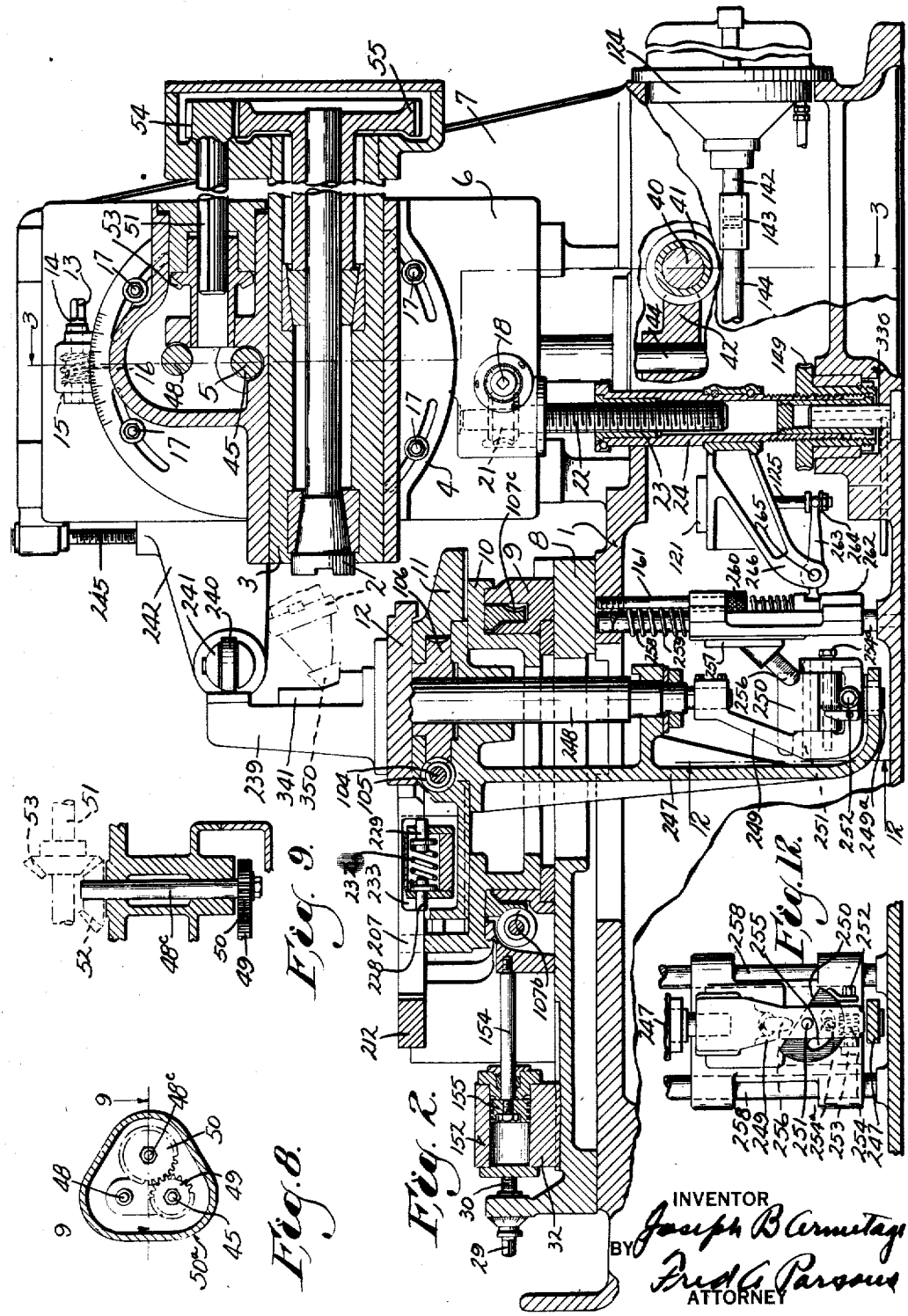
Fig. 2 is a view in vertical section of the same machine, taken approximately along line 2—2 of Fig. 1 and somewhat enlarged.

The spindle support 4 may be manually adjusted about pivot 5 by the means of a crank, not shown, applied to the squared end 13 Figs. 1, 2 of a worm shaft 14, upon which is fixed a worm 15, engaging complementary threads 16 on the support. The support 4 may be clamped in any position of its pivoted adjustment by suitable clamp means, as for instance clamp bolts 17.

Figure 3:
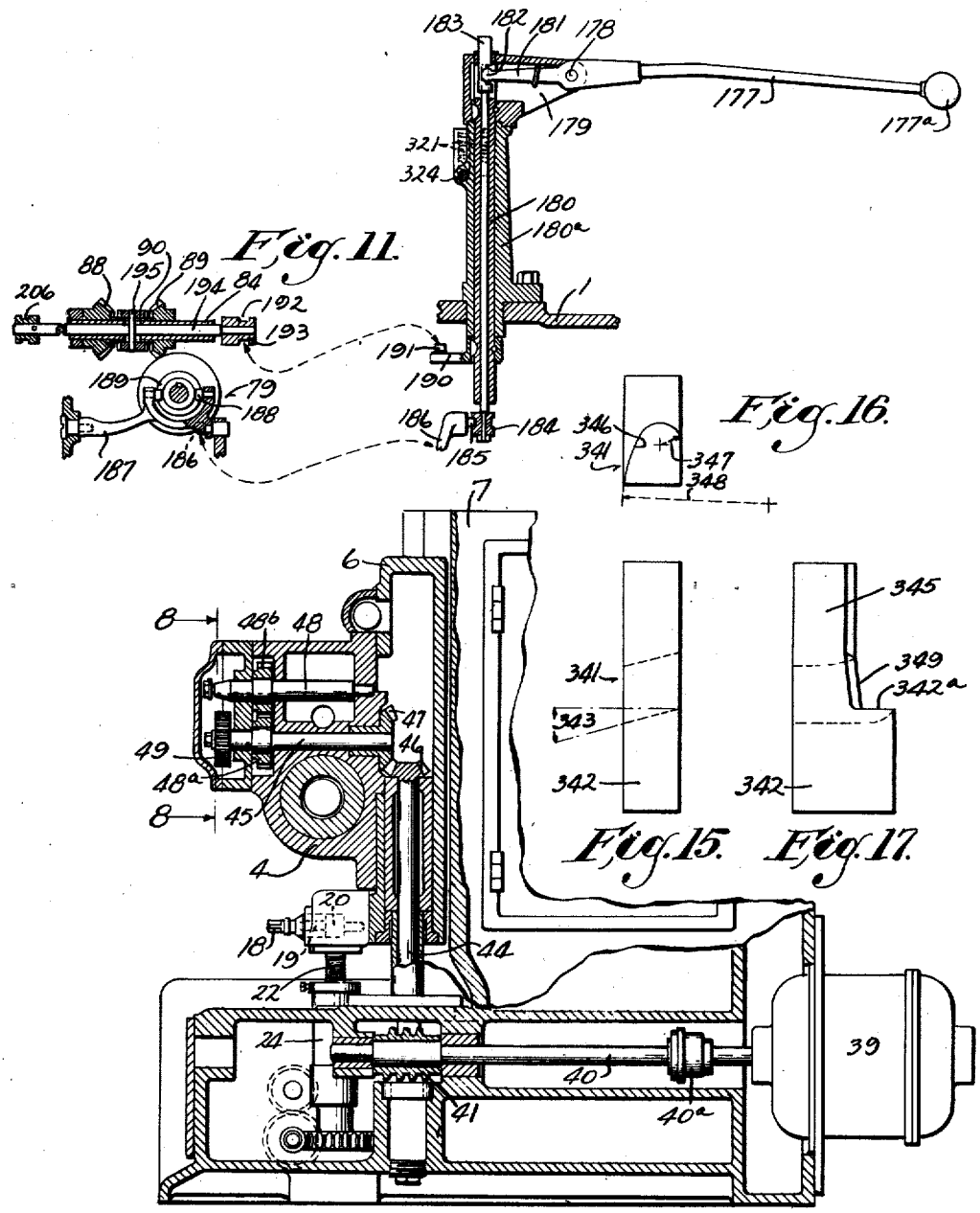
Fig. 3 is a fragmentary view of the same machine partly in elevation and partly in section approximately along line 3—3 of Fig. 1 and somewhat reduced in size.

The spindle support 6 may be manually adjusted vertically on column 7 in either direction by the means of a crank, not shown, applied to the squared end 18 Figs. 2, 3 of a worm shaft 19, on which is fixed a worm 20 engaging a worm wheel 21 fixed on a screw 22 which engages a nut 23 fixed with a vertically movable sleeve member 24. Power movement of the tool support 6 vertically in either vertical direction may also be had by means of transmission mechanism operative to raise or lower the sleeve member 24 and which will be later described.

The work support 8 may be manually adjusted relative to base 1, transversely of the vertical plane of the spindle axis, by means of a hand crank, not shown, applied to the squared end 25 of a screw 26, Fig. 1, which is journaled in bed 1 and engages a suitable nut 27 fixed on the support. The support 8 may be clamped in any position of its adjustment by suitable means such as clamp bolts 28.

The work support 9 may be manually adjusted on support 8 by a suitable crank, not shown, applied to the squared end 29, Figs. 1 and 2, of a screw 30, journaled in support 9, and engaging a nut 31 which is carried by a bracket 32. Work support 9 may be further adjusted manually by adjusting the bracket 32 relative to the support. For the purposes of the last mentioned adjustment the bracket 32 is adjustably fixed on the support by any suitable means, such as the clamp bolts 33. Support 9 is further provided with transmission mechanism for power movements, as will be later described.

The work support 11 may be manually adjusted relative to support 10 by the means of a crank, not shown, applied to the squared end 34, Figs. 1 and 7, of a shaft 35 connected for rotation of a nut 36 by the means of bevel gears 37, 38 the nut being rotatably mounted in support 11 and the screw 36a being fixed with support 10.

Transmission mechanism for rotation of spindle 2 includes the following mechanism: A motor 39, Fig. 3, drives a shaft 40 through a coupling device 40a of any suitable form. Fixed on shaft 40 is a worm 41, Figs. 2 and 3 engaging a worm wheel 42, in the bore of which is slidably keyed a shaft 44 vertically movable with support 6. Shaft 44 drives a shaft 45 Figs. 3, 8 through bevel gears 46, 47, the shaft 45 being journaled in support 4 and co-axial with the pivot 5 thereof. The shaft 45 drives a shaft 48 in reverse direction through gears 48a 48b and a shaft 48c, Figs. 8, 9, equidistant from the shafts 45 and 48, may be driven from either shaft through rate change means comprising a plurality of differently ratioed pairs of reversibly interchangeable gears such as the gear pair 49, 50, the arrangement providing both a spindle reverser and rate changer generally denoted as 50a, and generally similar to a rate changer shown in a co-pending application Serial No. 21,827, filed May 16, 1935 which has matured into Patent No. 2,081,288, issued May 25, 1937. Shaft 48c drives a shaft 51, Figs. 2, 9, through bevel gears 52, 53, the shaft 51 being slidably keyed in the bore of gear 53 and axially movable with the spindle quill 3. Fixed on shaft 51 is a pinion 54 meshed with a gear 55 fixed on spindle 2.

Figure 6:
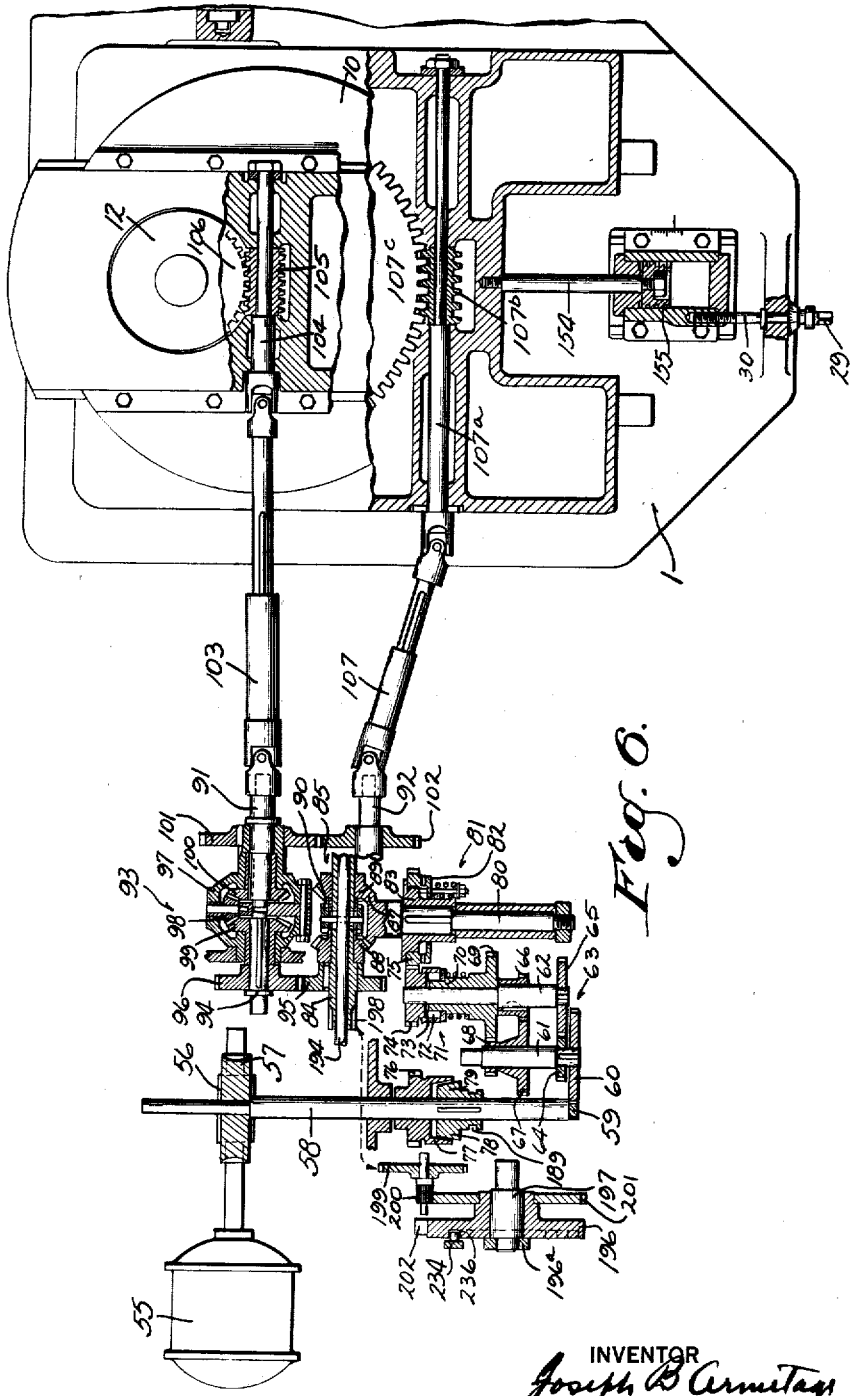
Fig. 6 is a sectional development partially expanded, of certain transmission mechanism of the machine.

Transmission mechanism for rotation of work supports 10 and 12 includes a motor 55, Figs. 1 and 6, a worm 56 fixed on the motor shaft and a worm wheel 57 fixed on a shaft 58. Shaft 58 drives alternative feed rate and rapid traverse rate trains.

Figure 4:
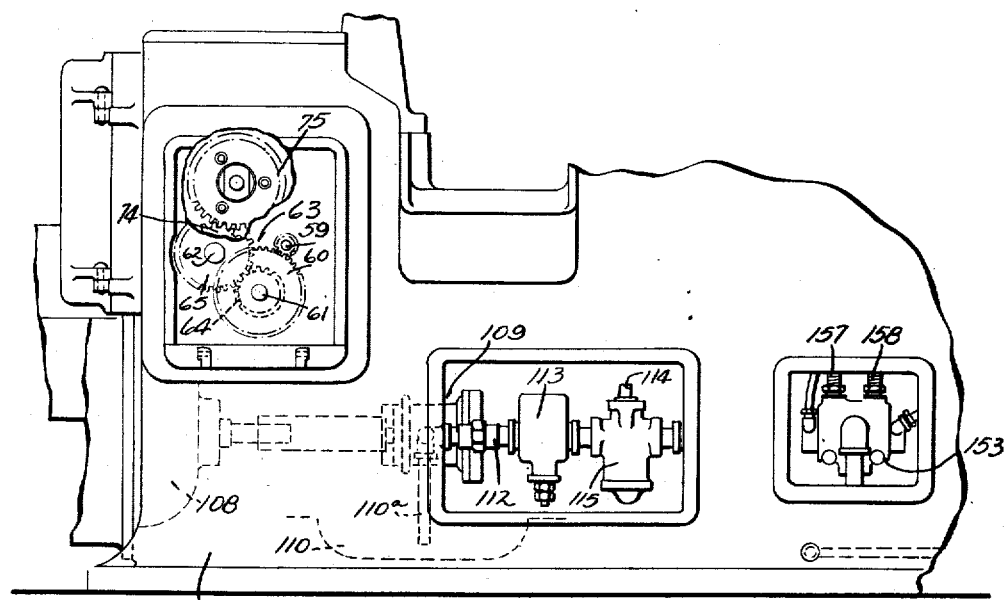
Fig. 4 is a fragmentary view in elevation of the same machine, viewed from the left in Fig. 1 and enlarged.

The feed rate train includes a pinion 59 fixed on the end of shaft 58, and a gear 60 removably fixed on a shaft 61, which drives a shaft 62 through a feed rate changer generally denoted by the numeral 63, Figs. 4 and 6, and which consists of a plurality of gear pairs of different ratio, such as the gear pair 64, 65, each reversibly interchangeable on the ends of the shaft 61, 62. Also included in the feed train is the reduction train consisting of gears 66, 67, 68, 69. The hub of gear 69 is extended to form the inner member 70 of an overrunning clutch device, generally denoted by the numeral 71, which is of a well known form incorporating rollers, such as 72, operating on cam surfaces on the inner member 70 to lock member 70 with an outer annular member 73, except when member 73 is driven in the same direction at a faster rate. The outer member 73 is fixed with a gear 74 which meshes with a gear 75.

The rapid traverse train includes a gear 76, Fig. 6, rotatable on the shaft 58 and fixed with the outer friction number 77 of a clutch 78 selective of feed or quick traverse rates and having an inner friction member 79 slidably keyed on the shaft. The gear 76 meshes with gear 75 and drives the gear at relatively rapid rate whenever clutch 78 is engaged, the clutch 71 then overrunning the feed train. At other times, when clutch 78 is disengaged, the feed train drives the gear 75.

The gear 75, Fig. 6, which is alternatively driven at feed or rapid traverse rates, as described, drives the work supports 10, 12 through table trains as follows: Gear 75 is rotatable relative to a shaft 80, but is normally connected to drive the shaft through an overload release clutch, generally denoted by numeral 81, which includes a clutch member 82 continuously spring pressed to yieldably engage complementary clutch teeth on the opposed faces of the gear and member. The clutch teeth are of angularly opposed faces to be disengaged by an overload torque in the usual manner, re-engaging to drive again when the torque is reduced to normal. An inner hub member 83 rotatably supports gear 75 and is fixed on the shaft 80 which drives a transverse sleeve shaft 84 through a reverser generally denoted by the numeral 85, and consisting of a bevel gear 87 fixed on shaft 80 and meshed with oppositely running bevel gears 88, 89 each rotatable on shaft 84 and each having clutch teeth on their inner axial faces in the usual form for similar reversers, the clutch teeth being alternately engageable to drive shaft 84 in the one or the other direction by the means of complementary clutch teeth on the opposite end faces of a clutch member 90 slidably keyed on shaft 84, the clutch member having an intermediate disengaged position.

The reverser 85, Fig. 6, is connected to drive two shafts, 91, 92 through a torque dividing differential device generally denoted by the numeral 93. Differential 93 includes a shaft 94 driven from shaft 84 through gears 95, 96, and disposed co-axial with a rotatable differential housing or spider 97 inside which are rotatably mounted a plurality of bevel planet gears 98 simultaneously engaging co-axial opposed bevel sun gears 99, 100, the sun gear 99 being fixed on the driven shaft 94 and the sun gear 100 being fixed on the shaft 91 to provide the one driving connection. The other driving connection, that is to the shaft 92, is through a gear 101 fixed on the extended hub of the rotatable differential housing or spider 97 and meshing with a gear 102 fixed on shaft 92.

From shaft 91, Fig. 6, the drive to the work support 12 is through an extensible universal coupling of usual form, generally denoted by the numeral 103, Figs. 1, 6, a shaft 104, a worm 105 and a worm wheel 106, Figs. 2, 6, which is fixed with the rotatable support 12.

From the shaft 92, Fig. 6, the drive to the work support 10 is through a similar extensible universal coupling 107, Figs. 1, 6, a shaft 107a, a worm 107b and a worm wheel 107c, Figs. 2, 6, fixed with the rotatable support 10.

The spindle support 6 is provided with transmission mechanism for vertical reciprocatory movement thereof, as follows: A motor 108, Figs. 1, 4, 10, drives a pump generally denoted by the numeral 109, which may be of any well known form and therefore is not shown in detail. Pump 109 has an inlet passage 110a receiving fluid, preferably oil, from a reservoir 110 in base 1, and delivers such fluid to an outlet passage 112, provided with a conventional type of overload relief valve 113. The pump outlet passage 112 supplies fluid to a passage 114 and another valve device generally denoted by the numeral 115 Figs. 4, 10, 10a which prevents supply of fluid to channel 114 until the fluid pressure in channel 112 reaches a predetermined minimum. This effect is accomplished by a valve plunger 116, Fig. 10a, continuously urged against a valve seat 117 by a spring 118, but having a piston element 119 receiving pressure from channel 112 thereby to open the valve as soon as the pressure rises to a point to overcome the spring. The pressure point at which the valve opens may be adjusted by a screw device 120 forming an adjustable abutment for spring 118.

The pressure fluid from channel 114 is connected through a control or follow valve generally denoted by the numeral 121, Fig. 10 and thence through channels 122, 123 to the ports of a hydraulic rotary motor 124, Figs. 1, 2, 10. The motor 124 may be of any suitable well known type for transforming hydraulic pressure fluid flow into rotary motion and therefore is not described in detail. Valve 121 is of a construction having an intermediate or central position in which no fluid passes to motor 124 through either channel 122 or 123 and having positions at either side of the central position respectively delivering fluid to the one or the other channel, whereby to operate motor 124 as a servo-motor in forward or reverse direction, or to stop the motor according to the position of the valve 121.

The construction of valve 121, Fig. 10, whereby to effect the results mentioned is as follows: The valve includes a shiftable valve plunger 125 having an intermediate annular groove portion 126 and reduced end portions 127, 128 adapted to provide passageways through the valve, a central port 129 is supplied with pressure fluid from channel 114, and this fluid may be admitted to the one or the other of ports 130, 131 according to the positions of the plunger 125, the ports being respectively connected to the channels 122, 123 leading to motor 124. Other ports 132, 133 connected to the channels 122, 123 are connectible to drain channels 134, 134 each delivering fluid to the reservoir 110. The form of the valve plunger 125 and the position of the ports is such that when the one channel 122 or 123 is connected to the fluid supply the other is connected to a drain channel, and the valve plunger also has an intermediate position on which both channels 122, 123 are closed against either entry or release of fluid, thereby locking motor 124 against rotation in either direction.

The valve 121 is provided with a spring 135 normally urging the plunger 125 upwardly in Fig. 10, and with a dash pot arrangement or damping means including a piston 136 fixed on the plunger and fitted within a cylinder portion 137 somewhat loosely to provide a leakage path to permit relatively slow movement of the piston. The cylinder 137 is kept supplied with liquid on both sides of piston 136 by the means of channels 138, 139 which are respectively provided with one-way valves 140, 141, each of well known form, opening toward the cylinder.

From the shaft 142, Fig. 2, of motor 124 the train for vertical movement of the spindle includes a coupling 143, a shaft 144, Figs. 2, 10, a pair of reversible and replaceable rate change gears 145, 146, Fig. 10, a shaft 147, a worm 148, and a worm wheel 149, Figs. 2, 10, which is maintained against axial movement and provided with a threaded bore engaging the threaded end 24a of the sleeve member 24 in manner to constitute therewith a self-locking or irreversible screw and nut driving connection, the sleeve being prevented from rotation and connected with the spindle support 6 as previously described.

The work support 9, Figs. 2, 10 together with the supports carried thereby, may be power shifted on support 8 by fluid supplied from the pump 109, previously described. Fluid from the pump outlet channel 112 is delivered to a channel 150 and thence to a channel 151, passing through a channel 150a, Fig. 10a, of the valve device 115, but unaffected by the valve action. Such fluid is supplied to a piston device or motor generally denoted by the numeral 152, Figs. 2, 10, through a reverser valve generally denoted by the numeral 153, Figs. 4, 10. Piston device 152 includes a piston rod 154, fixed with slide 9 at the one end and having a piston 155 at its other end, the piston being within a cylinder 156 fixed with the adjustable bracket 32, fluid being applied to the opposite piston ends by the channels 157, 158, Figs. 1 and 10, consisting of flexible tubes permitting of relative movement between reverse valve 153 and the cylinder 156.

The reverser valve 153, Figs. 4, 10, includes a valve plunger 159, an inlet port 160 connected to channel 151, a plurality of outlet ports 161, 162 respectively connected to the flexible channels 157, 158 leading to the piston device 152, and a plurality of drain ports 163, 164, which return fluid to reservoir 110. The plunger 159 is provided with grooves 165, 166 so arranged relative to the ports that, as the plunger is shifted in the one direction, fluid is supplied to the one of the channels 157, 158, and the other channel is connected to one of the drain ports 163, 164, and vice versa.

The reverser valve 153 is operated by fluid pressure controlled from a valve generally denoted by the numeral 167, Figs. 1, 10. The ends of the reverser plunger 159 are enclosed to form pistons respectively connected to receive fluid through channels 168, 169, respectively leading to ports 170, 171 of valve 167. The valve also has a supply port 172 connected by a channel 173 to receive fluid from channel 150, and a drain port 174 which returns fluid to reservoir 110. A valve member 175 is rotatable by the means of a hand lever 176, and provides passageways as shown in Fig. 10 which serve to connect either of the channels 168, 169 to the pressure port 172, and the other channel to the drain port.

The transmission for rotation of work supports 10 and 12, previously described, is controlled as follows: A hand lever 177 Figs. 1, 11 is pivoted at 178 on a bracket 179 fixed on a pivoted sleeve 180 which is journaled in a bracket 180a fixed on bed 1 whereby the hand grip portion 177a is vertically and horizontally movable. The vertical movement is connected for operation of the shiftable member 79, Figs. 6, 11 of the feed or quick traverse selective clutch 78, by the means of a lever arm 181, engaged at 182 with a suitable slot in a vertically movable rod or plunger 183 which, at its lower end carries a spool 184 having an annular groove engaging a pin 185 in a lever arm 186, the arm being fixed with a pivoted member 187 which carries pivoted shoes such as 188 engaging an annular groove 189 Fig. 6 in the member 79.

The horizontal movement of hand grip portion 177a, Fig. 1, is connected for operation of the shiftable clutch member 90, Figs. 6, 11 of the reverser clutch 85 by the means of a lever 190 fixed on the sleeve 180, and a pin 191 engaging an annular groove 192 in a spool 193 fixed on the inner end of a shiftable rod 194 extending through an axial bore of the sleeve shaft 84, and which is connected for axial movement of clutch member 90 by the means of a pin 195 extended through an axially elongated slot in the sleeve shaft 84.

By the means of the connections described the operator may manipulate the hand grip 177a Fig. 11 to effect either a change of driving direction or a change from the one to the other of feed and quick traverse rates of the transmission mechanism, for rotation of the work supports 10 and 12.

The machine also provides automatic control mechanism to effect a cycle of machine movements including rotation of each of the supports 10, 12 in predetermined sequence and relative duration, also movement of support 9 toward and from the tool spindle 2, together with tool spindle vertical movement, all in predetermined relative timing, direction and extent.

Figure 5:
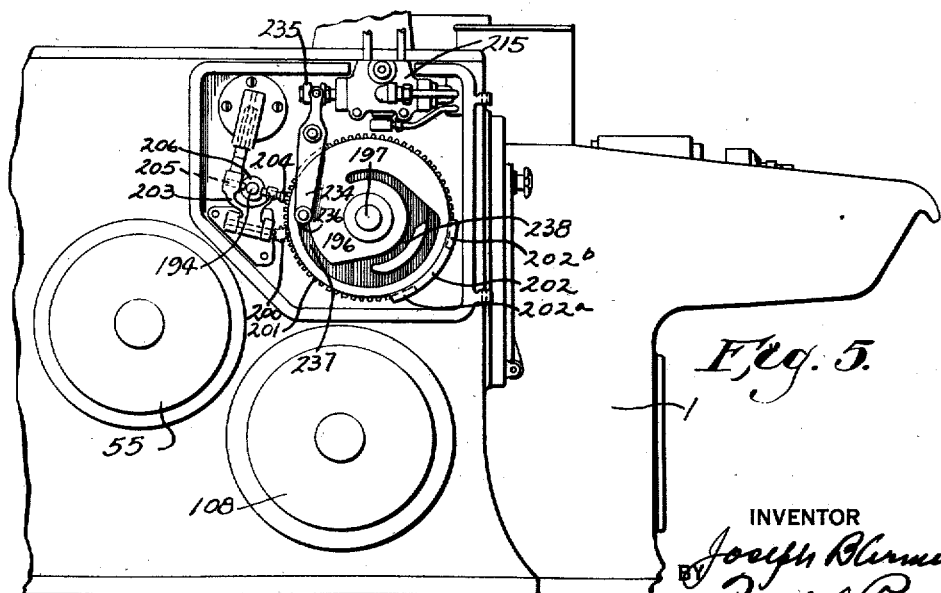
Fig. 5 is a fragmentary view in rear elevation of the same machine, viewed from the side uppermost in Fig. 1 and enlarged.

The automatic cycle of movement is primarily controlled by a cam member 196, Figs. 5, 6, 10 removably retained on a stud 197 by a nut 196a, and driven from the sleeve shaft 84 Fig. 6 of the train leading to supports 10, 12, through a pinion 198 fixed on sleeve shaft 84, a gear 199 engaging the pinion 198, and a pinion 200 fixed with gear 199 and engaging a gear 201 fixed with member 196.

In either direction of rotation of member 196, Figs. 5, 6, one of the angular ends 202a, 202b of a cam or dog portion 202, shifts a pivoted member 203 which is connected for movement of the shiftable clutch member 90 Fig. 6 of reverser clutch 85, the member 203 having a dog contact element 204 and pin members 205 engaging an annular groove in a spool 206 fixed on the outer end of shifter rod 194 Figs. 5, 6, 11 which is connected to move the clutch member 90, as previously described. The trip just described is effective only to shift the reverser clutch member 90 to a disengaged central position after the movement which is thus tripped is initiated by the hand lever 177 connected for the control of reverser 85 as previously described. After tripping from portion 202 the reverse movement is started by manipulation of the hand lever 177, the abutment of the dog portion and member 204 preventing re-engagement of the reverser to again effect the same direction of movement until after the dog portion has retreated during the reverse movement. The member 196 is so geared that a machine cycle does not require a complete revolution thereof, and it is obvious that other suitable dogs similar to the dog members 202 may be effective to limit the rotation as desired.

The member 196, Figs. 5, 6, also controls the relative extent of the rotation of work supports 10, 12, as follows: Means are provided to prevent rotation of the one support 10 or 12, while the other is rotating, including a shiftable plunger 207, Figs. 1, 2, 10, guided adjacent its ends in a slot provided therefor in the work support 11 at the one end, and in support 10 at the other end. The right hand end, Fig. 1, of plunger 207 may, during rotation of support 12, ride against a portion 208 of the support periphery and move into one or the other of slots 209, 210, thereby locking support 12 against rotation relative to supports 10, 11. The other end of plunger 207 may, during rotation of support 10, ride against the circular edge 211 of a member 212 fixed on support 9, and will then move into a slot 213, thereby locking support 10 against rotation.

The locking plunger 207 is urged in the one or the other endwise direction, by the means of pressure fluid derived from pump 109, Fig. 10, as follows. Fluid delivered to channel 150 as previously described passes through a channel 214, Fig. 10, and a control valve generally denoted by numeral 215, Figs. 5, 10, to a cylinder device generally denoted by the numeral 216, Figs. 1, 10.

The control valve 215, Fig. 10, includes an inlet port 217 connected to the supply channel 214, outlet ports 218, 219, respectively connected to different flexible tube channels 220, 221, drain ports 222, 223 each returning fluid to reservoir 110, and a valve plunger 224 shiftable endwise to opposite positions to connect either of the ports 218, 219 to receive fluid from the inlet port, and simultaneously connecting the other port 218, 219 to one of the drain ports, thereby to urge piston device 216 in the one or the other direction.

The piston device 216, Figs. 1, 10, includes a piston 225 fixed on a rod 226 which is fixed at its ends in the support 11, and movable on rod 226 in either direction according to the position of control valve 215 is a cylinder 227, having extended arm portions 228, 229 respectively carrying plungers 230, 231, continuously pressed outwardly by a spring 232. The plungers 228, 229 operate within a slot or recess 233, Figs. 2, 10, of the plunger 207 thereby providing a yieldable connection from the piston device 216 for either direction of operation of plunger 207.

The control valve 215, Figs. 5, 10, is shifted to effect movement of the locking plunger 207 at predetermined points in the rotation of control member 196 by the means of a pivoted lever 234, engaged at the one end with a spool 235 fixed on the extended end of the valve plunger 224, the lever being provided at the other end with a follower roller 236 engaging a cam groove 237 in member 196. Cam groove 237 may obviously be formed to effect shifting of the locking plunger 207 at any desired point in the rotation of the member 196 according to the nature of the work. The member 196, as previously explained, moves alternately through partial revolutions in opposite directions. One complete machine cycle, for the work piece for which cam groove 237 is intended, requires one forward partial revolution of member 196 and one reverse partial revolution back to the starting position as will later be described. During clockwise rotation from the position shown in Fig. 5 the cam groove 237 will effect a shift of locking plunger 207 in the one direction after about 180° of rotation of member 196, and since, for the work piece for which the cam groove shown is intended, the reverse movement of the locking plunger is not desired to take place at the same point in the other, or counterclockwise, direction of rotation of member 196, the groove 237 is formed at 238 to permit the plunger 207 to remain in the same position during the greater part of the counterclockwise rotation. Other forms of cam groove may be used to suit different requirements.

The rotation of supports 10, 12, controlled from member 196, as described, controls the movement of support 9 and the supports carried thereby, toward and from spindle 2, as follows: Fixed on support 12 is a cam or pattern member 239 Fig. 2, engaged by a follower roller 240 Figs. 1, 2 carried on a member 241 horizontally adjustable in a bracket 242 by the means of a crank, not shown, applied to the squared end of a screw 243 which is in threaded engagement with member 241, the member 241 being clamped in any adjusted position by clamp bolts 244. Bracket 242 is guided for vertical adjustment on column 7, effected by means of a crank, not shown, applied to the squared end of a screw 245, and the bracket is clamped by T bolts 246.

The valve 167, Figs. 1, 10 controlling the piston device 152, as previously described, is so operated that the piston of the device continuously urges the support 9 in the direction of the spindle 2 during cutting, whereby to maintain pressure contact between cam or pattern member 239 and follower 240. The face of the pattern member 239 is formed to suit the work piece operated upon and it functions to permit movement of the support 9, and the supports and work piece carried thereby in accordance with the form of the cam and the rate of rotation of the supports 10, 12.

The rotation of supports 10, 12 controlled from member 196 as previously described, also controls vertical movement of the spindle support 6 and spindle 2, as follows: a bracket member 247, Fig. 2, is fixed with the work support 11, to extend downwardly through supports 8, 9, 10 and into the interior of base 1.

A shaft 248 Fig. 2 is fixed with support 12 and journaled in bracket 247, and a cam carrier member 249 Figs. 2, 12 is fixed at the one end on shaft 248, and journaled at the lower end in the bottom portion of bracket 247, as at 249a. A cam or pattern member 250 constituting a template is pivoted in cam carrier 249 on a stud 251, being adjustable about its pivot by the means of a suitable wrench, not shown applied to the end 252 of a shaft 253 upon which is fixed a worm 254 engaging a suitable worm wheel segment on the periphery of the member 250, the member being clamped in any position of its pivotal adjustment by the means of a bolt 254a passed through a slot 255 in the body.

A follower member 256 is fixed in a bracket or slide member 257 Figs. 2, 10 to contact with the pattern face of member 250, the follower bracket slide being guided for vertical movement by a plurality of spaced rods 258 and pressed downwardly by the weight of the slide or by the means of springs, such as 259, to continuously urge contact of the follower 256 and pattern member 250, the follower being adjustably limited in downward movement by the nuts 260 threaded on a rod 261 which passes through a bore in the bracket 257. The bracket provides a recess or slot 262 in which one end of a pivoted lever 263 is retained, the other end of the lever engaging an annular groove in a spool 264 fixed on the extended end of the valve plunger 125 of the control or follow valve 121 of servo-motor 124, previously described, the pivot 265 of lever 263 being carried by a bracket or arm 266, which is fixed for vertical movement with the spindle support sleeve 24. The arm 266 also bodily carries the valve 121.

The lever contacting walls of slot 262 are formed at the lower side by a surface of the bracket or slide 257, and at the upper side by a member 267 guided on a rod 268 and continuously pressed by a spring 269, whereby all lost motion between the end of lever 263 and slot 262 is eliminated.

By the means of the structure described, the bracket 266 and spindle support sleeve 24 are maintained by motor 124 at a predetermined level or position with respect to the level of the follower member 256, Fig. 10. As long as such relationship exists the valve plunger 125 will remain in central position where the valve ports 130, 131, 132, 133 are blocked and the motor 124 is locked against rotation, as previously explained. But if movement of pattern member 250 permits or causes vertical movement of follower 256 then the follow valve 125 is shifted to admit fluid to the servo-motor 124 through whichever of the channels 123, 123 will effect its operation in the proper direction to correspondingly move the spindle support sleeve 24 and spindle 2. Thus the mechanism described constitutes a tracer or follower device, controlling vertical spindle movement in part in accordance with the rotation of the control member 196 and the supports controlled thereby, and in part in accordance with the form of the face of the pattern 250 where it contacts follower 256.

In the operation of the machine it is essential that a supply of pressure fluid shall be available at all times when the transmission for rotating the supports 10, 12 is operative, for otherwise the hydraulic portions of the control mechanism would not operate and confusion and damage to the machine might result. It is also necessary, for various reasons, that none of the supports shall be movable at feed or cutting rate except when spindle 2 is rotating. On the other hand it sometimes is desirable that some or all of the movement may be effected at a quick traverse rate while the spindle is not running, as for instance when setting up the machine for different work pieces, or when effecting a reverse movement with the work disengaged from the cutter.

For the above and various other reasons the several driving motors and other transmission and control mechanism of the machine are interlocked or inter-connected to provide certain predetermined effects or limitations in the controls, and to avoid other effects. The mechanism whereby this is accomplished is as follows:

Referring to Fig. 13, the driving motor 39 for spindle 2, the driving motor 55 for supports 10, 12, and the driving motor 108 for pump 109, are each diagrammatically indicated, in this instance, as electric motors of a type requiring a three wire current supply line, comprising line wires 270, 271, 272. The motor 124, for vertical spindle movement is a hydraulic motor and driven from motor 108, as previously described.

In the diagram, Fig. 13, the transmission and control mechanisms for effecting rotation of spindle 2 and of supports 10, 12 are diagrammatically represented by some of their elements. Thus the transmission line from motor 39 to spindle 2 shows the reverser and rate change mechanism 50a. Also the transmission from motor 55 to supports 10, 12 shows the feed rate changer 63 and over-running clutch 71 of the feed train, the feed or quick traverse train selective clutch elements 77, 79, the overload release device 81, the reverser 85 and the differential device 83, Fig. 13 also diagrammatically shows the control lever 171 and its connection for vertical movement thereof to shift the reverser 85 and for horizontal movement to shift the feed and quick traverse selector element 79, together with another connection to an interlock or control device generally denoted by the numeral 273, which will later be described.

All of the motors 39, 55, 108, Fig. 13, are supplied with line current through a master control switch generally denoted by numeral 274, including three live contacts 275, 276, and 277 engageable by three movable contacts 278, 279, and 280, which are connected for simultaneous movement to open the switch by means of a spring 281, or to close the switch by means of a solenoid 282. Current for solenoid 282 is initially derived from lines 270, 272 through a push-button switch 283 normally held open by a spring 284 but which may be closed to energize the solenoid by depressing a manually operable member 285. When the solenoid 282 is energized it closes the master switch 274 and an auxiliary switch 286a which completes a holding circuit for the solenoid, exclusive of the switch 283, whereby the operator may then release switch 283 and switch 274 remains closed until a switch 286 in the holding circuit, which is normally held closed by a spring 287, is opened by actuating a manually movable member 288.

Closing the master switch 274 supplies current to the distributing lines 289, 290, 291 from which current is supplied to the spindle motor 39 through a switch 292, generally similar to the master switch 274, and operated by a switch opening spring 293 and a switch closing solenoid 294. The solenoid 294 is controlled by a normally open switch 295 closed by a manually actuated member 296 and a normally closed switch 297 opened by a manually actuated member 298, a solenoid operated auxiliary switch 299 being provided to establish a holding circuit. The circuit of solenoid 294 also includes an overload release device generally denoted by numeral 300, which includes resistance heating elements 301, 302 in the lines leading to the motor, and a normally closed switch 303 having a temperature responsive element 304 which opens the switch contacts whenever the temperature rises in response to an overload of current to the motor, thereby interrupting the current to solenoid 294 and permitting spring 293 to open switch 292. The control of switch 292 differs from that of switch 274 in that the switch 292 will be interrupted if motor 39 is overloaded, and further differs in that the normally open switch 295 is connected to supply current to solenoid 294 only through an interlocking circuit that is not completed until a switch 305, which controls motor 108, is closed, as is indicated by the connections shown in the diagram Fig. 13. Therefore the motor 39 cannot be started unless motor 108 is running, but after motor 39 is started it may continue until stopped by opening switch 297, even if the switch 305 of motor 108 is opened, since closing of switch 292 completes another or holding circuit for solenoid 294 through the switches 297 and 299, and this circuit is independent of the position of switch 305.

The motor 108 Fig. 13, receives current through switch 274, the distributing lines 289, 290, 291, and the switch 305, which is generally similar to switches 274, 292. The operating devices for switch 305 include a switch opening spring 306, a switch closing solenoid 307, a normally open switch 308 closed by a manual member 309, a normally closed switch 310 opened by a manual member 311, a solenoid operated holding switch 312, and an overload release device 313 similar to the described device 300. In this instance both the lines for the supply of the switch closing solenoid 307, that is to say respectively through the manual switches 308 and 310, are completed independently of the control switches of any other motor, as is shown on the diagram Fig. 13, and therefore motor 108 may be running when the circuits to both the motors 39 and 55 are interrupted.

The motor 55, Fig. 13, receives current through switch 274, distributing lines 289, 290, 291 and a switch 314 which is generally similar to the switches 274, 292, and 305 but differently controlled. The switch 314 includes a switch opening spring 315, and a switch closing solenoid 316. The one supply line for solenoid 316 is derived from supply line 289 through the switch 305 of the motor 108, and the other solenoid supply line is derived from supply line 291 through an overload release device 317, similar to the described device 300, and through a movable contact member 318 which is shiftable to two positions respectively engaging with different contacts 319 and 320, which are each connectible to the same supply line 291 by different circuits, the connection of member 319 being derived through the switch 305 of motor 108, and that of the member 320 being derived through the switch 299 of the motor 39. In either position of member 318 the switch 314 will be opened whenever switch 305 is opened, and cannot be closed unless switch 305 is closed. However in the position of member 318 engaging the contact 320, the switch 305 being closed the switch 314 will be opened and closed in accordance with the opening and closing of switch 292. Therefore when member 318 engages contact 320, motor 55 is started and stopped in accordance with motor 39, assuming that motor 108 is operating.

The member 318, Fig. 13, is connected to be shifted by vertical movement of hand lever 177 simultaneously with the shifting of feed and quick traverse selector member 79 as follows: A pair of gears 321, Figs. 11, 13, are fixed together and journaled in the bracket 180a, the one gear of the pair passing through a cut-away portion of sleeve 180 to engage an annular rack portion 322 on the rod 183, and the other gear of the pair engaging a rack portion 323 of a rod, 324, Figs. 1, 11, 13 which is connected for movement of a rod 325 in column 7 by the means of a pivoted connecting rod 326. Member 318 is operated from rod 325 through a snap-over device generally denoted by the numeral 327 Fig. 13 which includes a cam 328 fixed on rod 325, the arms 329, 330 on member 318 and a tension spring 331 carried at the one end by member 318 and at the other end by the rod 325. When the cam 328 shifts member 318 past the center of its movement in either direction the spring 331 operates to quickly complete the movement of the member.

The connections to member 318 and to selector clutch member 79 are such that, when member 318 engages the contact 320, the clutch member 79 is in disengaged position, whereby the supports 10, 12 are driven through rate changer 63 at a feed rate, and when member 318 engages contact 319 the clutch member 79 is engaged, whereby supports 10, 12 are driven at quick traverse rate exclusive of the feed rate changer.

By the arrangement described it results that the entire machine may be stopped by opening switch 274. Closing the switch 274 does not, however, start operation of any portion of the machine. To start the machine, the switch 274 being closed, it is necessary to first start motor 108 by manual operation of starting switch 308. After this has been done the shifting of lever 177 to quick traverse position will start motor 55 for operation of the machine at quick traverse rate, even though the spindle motor switch 292 is open, but before any of the supports can be operated at the relatively slow feed rate the spindle rotating motor 39 must be started by manual operation of switch 295.

By reason of the described arrangement it also results that an overload of the spindle motor, whereby device 300 causes switch 292 to open, prevents operating of any of the supports at a feed rate, although the supports may still all be operated at quick traverse rate. But if the motor 108 is overloaded, whereby device 313 causes switch 305 to open, none of the bodily movable supports can be operated either at feed or quick traverse rate. And if the motor 55 is overloaded, whereby device 317 causes switch 314 to open, then all support power movements, excepting only spindle rotation and the movement of support 9 from cylinder device 152, will immediately stop since, except for those movements just mentioned, all support power movements either directly or indirectly originates in the motor 55.

The various manual elements for the controls just described are brought together at a point convenient for the operator in his normal position for operation of the other controls including the hand levers 176, 177. Thus a control unit 332 Figs. 1, 14 is fixed on bed 1, and carries the manual elements 285, 288; 296; 298; 309, 311 in pairs for convenient manipulation, and also other manual elements 334, 335 for similar control of the motors of supplemental devices, not shown, as for instance a coolant pump.

A counterbalance device is provided for the spindle support 6, and parts vertically movable therewith. In the machine as here shown this device is hydraulic, and includes a piston device generally denoted by the numeral 336, Figs. 2 and 10. The piston device comprises a piston 337 which is fixed in base 1 and a cylinder 338 fixed for movement with the spindle support sleeve 24. Fluid is supplied to the device from the pump 109 through the previously described supply channels 112, 150, Fig. 10, channel piping 339, and a drilled hole 340 in the piston 337. Pump 109, and therefore counterbalance 336, is in operation at all times while the machine is in operation, as explained above.

Each of the previously described manual adjustments of the machine is provided with means indicating the amount of adjustment effected, including, in each instance, dial and indicator parts graduated in units appropriate to the particular adjustment, such devices are shown in the drawings, but being well known in a variety of forms will not be described in detail.

An operating cycle for the machine may be illustrated by describing the cycle for the work piece shown in Figs. 15, 16, 17, such cycle being illustrative of cycles for a variety of work pieces for which the machine is particularly adapted. The work piece, generally denoted by the numeral 341, Figs. 2, 15, is removably mounted in a suitable work holding portion of the member 239. The work piece includes a shank portion 342, Fig. 17, which has an upper face 342a formed at an angle 343, Fig. 15, a blade portion 345 having a face 346, Fig. 16, which coincides at different portions with different radii 347, 348, and an intermediate angularly disposed portion 349, Fig. 17, which must blend or join smoothly at the top, Fig. 17, with the curved face 346, and at the bottom with the angular face 342a.

The operation now to be described is for a finishing operation on the surfaces 342a and 349, the surface 346 having been finished in a previous operation to the point where it will meet the finished surface 349. For this operation spindle 2 is set at an angle as indicated by the dotted outline, Fig. 2, and a suitably angular cutter 350 is used. The axes of rotation of supports 10, 12 are in the same vertical plane, parallel to the axis of spindle 2, and support 9 is adjusted crosswise by screw 26, Fig. 1, until that plane coincides with the spindle axis. The axes of rotation of supports 10, 12 are relatively offset, by member 34, Fig. 7 an amount equal to the difference between the two radii 347, 348 Fig. 16. The cam or pattern member 250 Figs. 2, 12 is also adjusted, by the means of member 252, to an annular position such that the follower 256, during rotation of the cam with supports 10 or 12, will move spindle support 6 and spindle 2 vertically to effect the machining of the surface 342a to a contour corresponding with the contour of the cam or template 250, which in this instance is disposed at the angle 343, Fig. 15.

The cam or pattern 239, Fig. 2, for this operation, is of the same form or contour as the face 346, Fig. 16, of the work piece, and the position of the work piece in its holder Fig. 2 is in exact vertical alignment with the pattern face. The follower roll 240, Fig. 2, is now adjusted vertically, by screw 245, to proper position to operate on cam 239, and adjusted horizontally, by screw 243, Fig. 1, for the center of the roll to coincide with the vertical plane of the spindle axis. It may be noted that, in such instances where the blade portion 345 is sufficiently long the previously finished face 346 may itself act as a cam for the follower roll 240. The spindle 2 is now adjusted vertically, by the means of the member 18, Fig. 2, for the cutter 350 to properly position the finished top face 342a Fig. 17, of the work piece. The spindle speed and direction, and the feed rate, are also suitably adjusted by the means previously described for the purpose, and a suitable control cam 196, Fig. 5, is placed on the stud 197, with the gears 200, 201, engaging to suitably position cam groove 237 for the required travel of supports 10, 12.

During the setting up process just described the various motors 39, 55, 108 Fig. 13 will be operated as required, within the restrictions imposed by the control and interlock devices previously described, and, during most of the machine adjustments the support 9 will be positioned to the left in Fig. 2, by operation of the control lever 176, Fig. 1, controlling piston device 152. At some suitable point in the setting up process the support 9 will be moved to the right in Fig. 2 until cam 239 contacts the follower roll 240, and the piston device 152, Fig. 2, will be adjusted, by screw 30, relative to support 8, to occupy a position such that when piston 155 is at the end of its right hand stroke it still exerts pressure forcing the cam 239 against the follower roll 240, whereby the support 9 and parts carried thereby will be forced to move in accordance with the form of cam 239 as the supports 10 or 12 are rotated.

With the machine set up as described the cam 239 would generate a curve corresponding to work face 346 Fig. 16, during rotation of either support 10 or 12, but for various reasons it is preferable to rotate only the support 12 while cutting the radius 347, Fig. 16 and to rotate support 10 while cutting the radius 348. This result is effected by the control of the plunger 207, Figs. 1, 10. The plunger may shift right or left in Fig. 1, as previously explained, whereby to enter the slots 209, 210, 213. At the start of the described operation both the supports 10, 12 are at the extreme of their clockwise rotation in Fig. 1 and the plunger 207 is engaged in slot 210. Therefore when the cutting direction of movement is started by manual operation of lever 177 it is anti-clockwise in Fig. 1, and only the support 10 can rotate, the support 12 being locked by the plunger 207. This condition continues until the portion of surface 346, Fig. 16, which is formed to the radius 348, is completed, at which time the end of plunger 207 abuts against the extended side 351, Fig. 1 of slot 213, but prior to this point, the cam groove 237 of control member 196, Fig. 5 has operated valve 215 to reverse the fluid pressure in plunger cylinder device 216 and during the latter part of the rotation of support 10 the plunger has been pressed against the circular surface 211 of the member 212. As soon, therefore as the plunger strikes abutment 351 it also moves into slot 213 and out of slot 210, permitting support 12 then to start rotation for finishing the portion of work surface 346, Fig. 16, which is formed at the radius 347, this movement continuing until the surface 346 is finished. Following this the dog portion 202 of member 196, Fig. 5 trips the reverser 85 in the transmission of supports 10, 12, Fig. 6, to its intermediate position, stopping support rotation.

After forward movement and stop, as described, the operator reverses the movement of supports 10, 12 by the means of lever 177. Since plunger 207 is still engaged in slot 213, the reverse movement starts with clockwise rotation of support 12, which continues until the right-hand end of plunger 207, Fig. 1, strikes the extended side wall 352 of the slot 210. The cam groove 237, Fig. 5, at some point in the reverse movement of support 12, operates valve 215 to cause plunger 207 to be urged to the right in Fig. 1, and when the plunger strikes abutment wall 352 it also reenters slot 210 and is withdrawn from slot 213, following which support 10 starts its reverse rotation. This continues until the dog portion 202, Fig. 5, of member 196, again trips the reverser 85 to motion interrupting positon, stopping the movement of supports 10, 12 at the original starting point.

During the described movements in either direction the non-cutting portions may be traversed at the relatively fast quick traverse rate by suitably manipulaitng lever 177. Ordinarily all the reverse movement, and some portions of the forward movement will be at quick traverse rate.

Also ordinarily, at the completion of forward movement, and before reverse movement starts piston device 152 is operated by the lever 176 to shift the support 9 to the left in Fig. 1, to a position in which the work piece and cutter are separated during return movement to the starting position, the support being again shifted, after a new work piece is loaded, to its right-hand or cutting position, to render cam 239 operative before the start of the next cutting cycle.

What is claimed is:

1. In a machine tool the combination with a tool support and a work support, of a pattern member, a follower member contacting said pattern member, and transmission and control mechanism including a first train for effecting relative movement of said follower member and said pattern member, a second train for effecting relative movement of said supports and controlled for direction and extent of support movement in accordance with the aforesaid relative movement of said pattern and follower members, another train for effecting relative movement of said supports, and independent control means for said other train operative to effect a direction and extent of support movement substantially corresponding to the direction and extent of movement that may be effected by said second train.

2. In a machine tool the combination with a tool support and a work support, of a pattern member, a follower member contacting said pattern member, and transmission and control mechanism including a first train for effecting relative movement of said tool support and said work support and movement of said follower member across said pattern member, a second train for effecting relative movement of said supports in direction transverse to the direction of the movement effected by said first train including a reversibly operable rotatable fluid motor, and valve means controlling the direction and extent of rotation of said motor, and thereby the direction and extent of said transverse support movement, in accordance with said relative movement of said pattern and follower members.

3. In a milling machine the combination of a rotatable tool spindle, a work support movable relative to said spindle in a path transverse to the axis thereof, a pattern member, a follower member contacting said pattern member, and transmission and control mechanism including a train for spindle rotation, a second train for relative movement of said pattern and follower members, a third train for said relative spindle and support movement including a pump and a reversible fluid operable rotary motor and a screw and nut mechanism driven thereby, and valve means controlling the direction and extent of rotation of said fluid motor in accordance with said relative movement of said pattern and follower members.

4. In a milling machine the combination of a base, a tool spindle rotatably supported thereon, a first work support rotatably carried by said base, a second work support rotatably carried by said first support for rotation on an axis substantially parallel to the axis of the first support, transmission mechanism connectible for rotation of each of said supports to effect a plurality of arcs of cutting movement relative to said tool spindle and respectively determined by rotation of different of said supports, and control means for said transmission for effecting the rotation of said supports one after another said means including a device preventing simultaneous rotation thereof.

5. In a milling machine the combination of a base, a tool spindle rotatably supported thereon, a first work support rotatably carried by said base, a second work support rotatably carried by said first support for rotation on an axis substantially parallel to the axis of said first support, transmission mechanism including a differential device having two driving elements simultaneously connected for rotation of said two supports respectively, and control mechanism for effecting predetermined relative time and extent of rotation of both said supports including a member driven from said transmission exclusive of said differential device.

6. In a milling machine the combination of a rotatable tool spindle, a movable work support, another movable support, a transmission including a differential device simultaneously connected with both of said supports, and control mechanism determinative of the relative time and extent of movement of each support including a control member driven from said transmission to exclude said differential device.

7. In a machine tool the combination of a rotatable spindle and a support relatively movable in a plurality of mutually transverse paths, a plurality of power trains respectively for said relative movement in different of said paths, control means for one of said trains including a first pattern member and a follower member movable relative thereto, control means for the other of said trains including a second pattern member and a follower movable relative thereto, and means operative to effect predetermined support positions in the one path relative to the support positions at various points in the other path.

8. In a machine tool the combination of a rotatable spindle and a relatively movable support, a first power operable transmission for rotation of said spindle, a second power operable transmission for said relative movement, a control device shiftable for altering the effect of said second transmission, a third power operable transmission for shifting said control device, a first controller for alternative connection or interruption of power to said first transmission, a second controller for alternative connection or interruption of power to said second transmission, means normally preventing the power connecting effect of said second controller when said first controller is of power interrupting effect, a third controller operable for establishing a power connection of said second transmission irrespective of the interrupting effect of said first controller, and means preventing power connecting effect of either said first, second or third controllers except during power actuation of said third transmission.

9. In a machine tool the combination of a rotatable spindle and a relatively movable support, a first power operable transmission mechanism for rotation of said spindle, a second transmission mechanism for power operation of said relative movement at alternative feed or quick traverse rates, a control device shiftable for altering the effect of said second transmission, a third transmission for shifting said control device, a controller shiftable for selection of said alternative feed or quick traverse rates, means normally operable in the feed rate position of said controller to prevent power actuation of said second transmission unless said first transmission is power actuated, means normally operable in the quick traverse rate position of said controller to permit power actuation of said second transmission irrespective of the power connection of said first transmission, and means operative to interrupt said second transmission when power is interrupted to said third transmission irrespective of the position of said control means.

10. In a machine tool, the combination of a spindle support and another support, a power operable transmission for relative vertical movement of said supports, a pattern member, a follower member contacting said pattern member and movable relative thereto, means controlling said transmission in accordance with the relative movement of said members, a counterbalance device for the vertically movable support, and means operative to interrupt the power connection of said transmission except during operation of said device.

11. In a machine tool, the combination with a spindle support and a work support one of which is vertically movable, of a power operable transmission for effecting relative vertical movement of said movable support, a counterbalance device for the vertically movable support including a power operable pump and fluid operable piston means, and means operative upon interruption of said pump to simultaneously interrupt power operation of said transmission.

12. In a machine tool the combination with a rotatable tool spindle and a support, said spindle and support being relatively movable in a vertical path and in a transverse path, of a power operable transmission for said transverse movement, a counterbalance device normally continuously operative to urge said vertical movement upwardly and including a power operable pump and fluid operable piston means, and control means operative upon interruption of power operation of said pump to simultaneously interrupt power operation of said transmission.

13. In a machine tool the combination with a tool support and a work support relatively movable in a plurality of mutually transverse paths, of a transmission for said relative movement in one of said paths, a transmission for said relative movement in another of said paths including a power operable pump and a fluid operable motor, fluid operable control means for the first mentioned transmission and connectible for operation by fluid from said pump, and means disposed to permit flow of fluid for operation of said control means and operative to prevent flow of fluid from said pump for operation of said motor except during supply of fluid at or above a predetermined minimum pressure for operation of said control means.

14. In a machine tool the combination with a tool support and a relatively movable work support, of a transmission for relative movement of said supports including a pump and a fluid operable motor connectible therewith, fluid operable control means for said transmission, and means responsive to a predetermined minimum pressure and operative to prevent supply of fluid from said pump for operation of said motor except during supply of fluid at or above said predetermined minimum pressure for operation of said control means.

15. In a machine tool the combination of a tool support and a work support movable relative thereto in a plurality of mutually transverse paths, a plurality of pattern members, a plurality of follower members respectively contacting the different pattern members and movable relative thereto, means controlling relative movement in said different paths respectively in accordance with the relative movement of the different pattern and follower members, hydraulic means for establishing pressure of said contact between one of said pattern members and its follower member for one of said paths, and means preventing relative movement of said supports in the other of said paths except during supply of hydraulic fluid to said hydraulic means at predetermined minimum pressure.

16. In a machine tool the combination with a tool support and a work support movable relative thereto in a plurality of mutually transverse paths, of a plurality of pattern members, a plurality of follower members respectively contacting the different pattern members and movable relative thereto, means controlling relative movement of said supports in said different paths respectively in accordance with the relative movement of the different pattern and follower members, pressure means for establishing pressure between the contacting pattern and follower members along one of said paths, and control means operative to prevent relative movement of said supports in another of said paths except during operation of said pressure means at or above a predetermined minimum pressure.

17. In a machine tool the combination with a tool support and a work support relatively movable in a first path and in a transverse second path; of a pattern member, a follower member contacting said pattern member and movable relative thereto in a plurality of paths, a transmission for relative movement of said supports in said first path and for simultaneous relative movement of said pattern and follower members in one of their paths to thereby cause relative movement of said pattern and follower in another path in accordance with the configuration of said pattern member, a transmission for relative movement of said supports in said transverse path including a pump and a hydraulic motor, means operable to control the last mentioned transmission for relative support movement in said transverse path in accordance with the relative movement of said pattern and follower members in their said other path, and another transmission for relative movement of said supports in said transverse path and independently controlled to effect support movement substantially corresponding to movement controlled from said pattern and follower members.

18. In a machine tool the combination with a tool support and a work support relatively movable in first, second and third paths, of a pattern member, a relatively movable follower member contacting said pattern member, transmission and control means for simultaneous movement of said supports in said first and second paths and for simultaneous relative movement of said pattern and follower members in corresponding first and second paths, another transmission mechanism for relative movement of said supports in said third path, and control mechanism for said other transmission to effect support movement in said third path corresponding to the relative movement of said pattern and follower in said corresponding first and second paths.

19. In a machine tool the combination of a tool support and a work support relatively movable in a first, second and third path, a pattern member, a relatively movable follower member contacting said pattern member, transmission and control means for simultaneous movement of said supports in said first and second paths and for simultaneous relative movement of said pattern and follower member in corresponding first and second paths, another transmission for relative movement of said supports in said third path and including a power operable pump and a motor connectible for operation therefrom, valve means controlling the connection of said pump and shiftable to determine the direction and extent of actuation of said motor, and means operative from the relative movement of said pattern and follower members in said corresponding first and second paths for shifting said valve means.

20. In a machine tool the combination with a tool support and a work support relatively movable in first, second and third paths, of a pattern member, a relatively movable follower member contacting said pattern member, transmission and control means for simultaneous movement of said supports in said first and second paths and for simultaneous relative movement of said pattern and follower members in corresponding first and second paths, another transmission mechanism for relative movements of said supports in said third path including a power operable pump and a hydraulic motor connectible for operation therefrom, and means controlling the actuation of said hydraulic motor to effect support movement in said third path corresponding to the relative movement of said pattern and follower in said corresponding first and second paths.

21. In a milling machine the combination of a rotatable spindle, a spindle support, a plurality of work supports one of which is supported by the other and both of which are rotatable respectively on mutually parallel offset axes, means for relative adjustment of said work supports to adjust the distance between said axes, means for relative adjustment of said work supports and said spindle support in a direction transverse to said axes, and means for rotation of said work supports one after another in the same direction whereby to finish a work piece having joined segmental surfaces, the radius of the one surface segment being determined by the center distance between a work support axis and the spindle support and the radius of the other segmental surface being determined by the relative adjustment of said work supports.

22. In a milling machine the combination of a rotatable spindle, a spindle support, a plurality of work supports one of which is supported by the other and both of which are rotatable respectively on mutually parallel offset axes, means for relative adjustment of said spindle support and said work supports in a direction transverse to said axes, means for relative adjustment of said work supports to vary the amount of offset of said axes, power means for rotation of said work supports one after another in the same direction whereby to finish a work piece surface having joined curves, the radius of the one curve being determined by said spindle support adjustment, and the radius of the other curve being determined by the amount of said offset, and power means for reverse rotation of said supports to their starting position at relatively rapid rate.

23. In a machine tool, the combination with a movable work support, of a tool support operatively associated with said work support, a guiding template carried by one of said supports, a drive mechanism disposed to move one of said supports relative to the other support, said drive mechanism being self-locking to prevent reverse transmission of movement from the driven support, and a servo-motor disposed to actuate said irreversible drive mechanism in accordance with said guiding template, whereby a work piece carried by said work support may be machined by a tool carried by said tool support to a contour determined by the shape of said guiding template.

24. In a machine tool, the combination with a movable work support and a guiding template carried thereby, of a tool support operatively associated with said work support, an irreversible drive mechanism disposed to move said tool support relative to said work support, a servo-motor operatively associated with said guiding template, and a rate changer operatively connecting said servo-motor to said irreversible drive mechanism to actuate said tool support in accordance with said guiding template at a selective rate of response thereto, whereby a work piece carried by said work support may be machined by a tool carried by said tool support to a contour determined by the shape of said guiding template.

25. In a machine tool, the combination with a rotatable spindle and support mounted for relative movement in a plurality of mutually transverse paths, of a plurality of power transmitting trains connected respectively in a manner to effect said relative movement in different of said paths, control means for each of said trains each including a pattern member and a cooperating follower member, and interlocking means associated with said control means in a manner to effect predetermined relative positioning of said spindle and said support throughout the range of said relative movement thereof.

26. In a milling machine, the combination with a rotatable tool spindle, of a movable work support including two support members relatively movable in the same plane, a transmission for actuating said work support including driving means and a torque dividing differential mechanism having driving parts connected respectively to drive different of said support members, and control mechanism operative to determine the relative time and extent of movement of each of said support members by said differential mechanism.

27. In a milling machine, the combination with a rotatable tool spindle and a movable work support including two independently movable elements, of a transmission for actuating said work support including a differential mechanism having driving parts connected to said elements respectively in manner to drive each element independently, and control means disposed to selectively hold one or the other of said elements from being driven, whereupon the free element only may be driven by said differential mechanism.

28. A work support for a machine tool comprising a rotatably mounted table, a second table rotatably mounted on said first table in position to be revolved about the axis thereof, means for relative adjustment of the axes of said tables, securing means on said second table for holding a work piece, driving means selectively operative to rotate either one or the other of said tables for moving a work piece supported thereon along either one of two arcuate paths, and control means including a device operative to prevent simultaneous rotation of said tables.

29. A work support for a machine tool comprising a first rotatably mounted table, a second table rotatably mounted on said first table for independent rotation in cooperation therewith, securing means on said second table for holding a work piece, driving means operative to rotate said tables for moving a work piece supported thereon along either one of two arcuate paths respectively determined by rotation of the different tables, a pattern carried by said second table, a follower stationarily mounted in position to engage said pattern, and fluid pressure means disposed to urge both of said tables in direction to press said pattern against said follower, whereby the path of movement of a work piece held in said securing means may be made to conform with the shape of said pattern.

30. In a milling machine, the combination with a rotatable tool supporting spindle and a work support capable of movement relative to said spindle along two paths, of a transmission mechanism for actuating said work support, including a driving element and force-dividing means disposed to divide the force exerted by said driving element and to apply said divided force in manner tending to effect movement of said work support along both of said paths, and control mechanism arranged to permit movement of said work support along the one or the other of said paths but to prevent movement along both paths simultaneously and operative to determine the extent of movement thereof along each of said paths alternatively under the influence of the forces exerted by said force-dividing means.

31. In a machine tool, the combination with relatively movable tool supporting and work supporting elements, of a transmission mechanism for effecting relative movement of said supporting elements along one path including a source of fluid pressure and a connected fluid operable motor, fluid operable control means connected to said source of fluid pressure and operative to control other movements of said supporting elements, and pressure responsive valve means operative to close the connection to said motor when the pressure of said source falls below a predetermined minimum necessary to operate said control means.

32. In a milling machine for cutting contiguous arcs of different curvatures, the combination with a frame and a tool supporting spindle rotatably carried by said frame, of a work moving structure carried by said frame and including a work holder disposed to hold a workpiece for engagement by a tool in said tool spindle, a pivotally mounted work support disposed to adjustably support said work holder for pivotally moving the workpiece along an arc of predetermined curvature, a pivotally mounted work table disposed to adjustably carry said work support for pivotally moving the workpiece along another arc of predetermined curvature, means for adjusting the position of the pivot axis of said table relative to said frame to position the workpiece in cutting relationship with the tool in said tool spindle, and driving and control means for turning said work support and said work table successively to machine on said workpiece a continuous curved surface presenting connected portions having different degrees of curvature.

33. In a machine tool, the combination with a frame and a supporting member movably mounted on said frame, of a screw and nut mechanism disposed to move said member relative to said frame including a nut rotatably mounted in said frame in manner to resist longitudinal movement therein and cooperating with a screw secured against rotation on said supporting member, power means for rotating said nut to move said member, and manually operable means connected to move said supporting member longitudinally relative to said screw for adjusting the position of said member without altering the position of said screw relative to said nut.

34. In a machine tool, the combination with a work support and a tool support mounted for relative movement, of a screw and nut mechanism disposed to effect said relative movement, a template and hydraulic follow valve mechanism for controlling said relative movement, and a rotary hydraulic motor disposed to actuate said screw and nut mechanism in accordance with the controlling action of said template and follow valve mechanism, whereby a workpiece on said work support may be machined by a tool in said tool support to a predetermined contour determined by said template.

35. In a machine tool the combination of a tool support and a work support, transmission and control mechanism for relative movement of said tool support and said work support to effect a cam controlled cutting movement in a first plane, other transmission mechanism for relative movement of said supports in a second plane transverse to said first plane, and control mechanism for determining the direction and extent of said movement in said second plane including a pattern and follower member relatively movable in accordance with said cam controlled movement in said first plane.

36. In a machine tool the combination of a tool support and a work support, transmission mechanism for relative movement of said supports in a first plane, control mechanism for said transmission including a pattern and follower member co-operative to effect an irregular cutting movement in said first plane, a second transmission for relative movement of said supports in a second plane transverse to said first plane, and control mechanism for said second transmission including another pattern member and another follower member relatively movable from the first mentioned transmission.

37. In a machine tool the combination with a tool support and a work support, of a pattern member, a follower member contacting said pattern member, and transmission and control mechanism including a first train for effecting relative movement of said tool support and said work support and movement of said follower member across said pattern member, a second train for effecting relative movement of said supports in direction transverse to the direction of the movement effected by said first train including a reversibly operable rotatable fluid motor, and valve means controlling the direction and extent of rotation of said motor, and thereby the direction and extent of said transverse support movement, in accordance with said relative movement of said pattern and follower members, said valve means having a central position trapping the motor fluid to prevent rotation of said motor in either direction.

38. In a machine tool the combination of a plurality of relatively movable supports, a transmission for said relative movement including a power operable pump and a fluid operable motor, valve means shiftable to positions respectively for connection and for interruption of fluid supply from said pump to said motor, a piston device including a piston connected for shifting movement with said valve means, a unidirectional pressure fluid source, and damping means for said piston including a plurality of passageways respectively connected for supply of fluid to different ends of said piston and each simultaneously connected to receive fluid from said pressure source, a restricted channel connected between the opposite ends of said piston and means preventing movement of fluid from one end of said piston to the other except through said restricted channel.

39. In a machine tool the combination of a work support, a tool support movable relative to said work support, a train connected with one of said supports for said relative movement including engaged screw and nut elements co-operative for transmission of power to the connected support but self-locking to prevent transmission of power in the other direction, pattern control means including a plurality of relatively movable elements, a fluid pressure source, a fluid operable motor connectible between said source and said train, and valve means controlling the direction and extent of actuation of said fluid operable motor in accordance with the relative movement of the elements of said pattern control means.

40. In a milling machine for cutting contiguous arcs of different curvatures, the combination with a frame and a tool supporting spindle rotatably carried by said frame, of a work moving structure carried by said frame and including a work holder disposed to hold a workpiece for engagement by a tool in said tool spindle, a pivotally mounted work support disposed to adjustably carry said work holder for pivotally moving the workpiece along a first arc of predetermined curvature, a pivotally mounted work table disposed to adjustably carry said pivoted work support for pivotally moving the workpiece along a second arc of predetermined curvature, a pattern carried by said work holder and presenting arcuate surfaces, a follower mounted to engage said pattern, means for adjusting the positions of the pivot axes of said support and said table to make said first and second arcs correspond in curvature to the arcuate surfaces of said pattern, means for urging said table relative to said frame in manner to engage said pattern with said follower and to position the workpiece in cutting relationship with the tool in said tool spindle, and driving and control means for turning said work support and said work table successively at the same feeding rate and in predetermined relationship with said pattern to machine on said workpiece connected uniformly surfaced arcuate portions of curvatures corresponding with the curvatures of said first and second arcs said arcuate portions being blended into a continuous uniform curved surface of contour predetermined by said pattern.

41. A work support for a machine tool comprising a rotatably mounted table, a second table rotatably mounted on said first table in position to turn about an independent axis, means to adjust the positions of said axes, securing means on said second table for holding a workpiece, driving means selectively operative to rotate either the one or the other of said tables for moving the workpiece supported thereon along either of two arcuate paths determined by the positions of said axes, and means to control said driving means to effect sequential rotation of said tables in predetermined manner to machine on said workpiece contiguous surfaces of different curvatures.

42. In a machine tool, the combination with a frame and a supporting element movably mounted on said frame, of power driven means operatively connected to move said supporting element relative to said frame, said means comprising a screw and nut driving mechanism, a worm wheel operatively connected to actuate said screw and nut driving mechanism, a worm disposed to turn said worm wheel, a rotary hydraulic motor operatively connected to rotate said worm and said driving mechanism in either direction selectively, and means responsive to movement of said supporting element relative to said frame and operative to control said rotary hydraulic motor.

JOSEPH B. ARMITAGE.

CERTIFICATE OF CORRECTION.

Patent No. 2,157,471.  May 9, 1939.

JOSEPH B. ARMITAGE.

It is hereby certified that error appears in the printed specification of the above numbered patent requiring correction as follows: Page 2, first column, line 51, strike out the word "vertical"; page 7, second column, line 32, for "while" read that; page 8, second column, line 32, for "positon" read position; line 38, for "manipulaitng" read manipulating; page 9, second column, line 69, claim 11, after the word "of" insert power operation of; page 11, first column, line 46, claim 23, strike out the word "irreversible"; and that the said Letters Patent should be read with this correction therein that the same may conform to the record of the case in the Patent Office.

Signed and sealed this 20th day of June, A. D. 1939.

Henry Van Arsdale (Seal)   Acting Commissioner of Patents.

pivotally mounted work table disposed to adjustably carry said pivoted work support for pivotally moving the workpiece along a second arc of predetermined curvature, a pattern carried by said work holder and presenting arcuate surfaces, a follower mounted to engage said pattern, means for adjusting the positions of the pivot axes of said support and said table to make said first and second arcs correspond in curvature to the arcuate surfaces of said pattern, means for urging said table relative to said frame in manner to engage said pattern with said follower and to position the workpiece in cutting relationship with the tool in said tool spindle, and driving and control means for turning said work support and said work table successively at the same feeding rate and in predetermined relationship with said pattern to machine on said workpiece connected uniformly surfaced arcuate portions of curvatures corresponding with the curvatures of said first and second arcs said arcuate portions being blended into a continuous uniform curved surface of contour predetermined by said pattern.

41. A work support for a machine tool comprising a rotatably mounted table, a second table rotatably mounted on said first table in position to turn about an independent axis, means to adjust the positions of said axes, securing means on said second table for holding a workpiece, driving means selectively operative to rotate either the one or the other of said tables for moving the workpiece supported thereon along either of two arcuate paths determined by the positions of said axes, and means to control said driving means to effect sequential rotation of said tables in predetermined manner to machine on said workpiece contiguous surfaces of different curvatures.

42. In a machine tool, the combination with a frame and a supporting element movably mounted on said frame, of power driven means operatively connected to move said supporting element relative to said frame, said means comprising a screw and nut driving mechanism, a worm wheel operatively connected to actuate said screw and nut driving mechanism, a worm disposed to turn said worm wheel, a rotary hydraulic motor operatively connected to rotate said worm and said driving mechanism in either direction selectively, and means responsive to movement of said supporting element relative to said frame and operative to control said rotary hydraulic motor.

JOSEPH B. ARMITAGE.

CERTIFICATE OF CORRECTION.

Patent No. 2,157,471.   May 9, 1939.

JOSEPH B. ARMITAGE.

It is hereby certified that error appears in the printed specification of the above numbered patent requiring correction as follows: Page 2, first column, line 51, strike out the word "vertical"; page 7, second column, line 32, for "while" read that; page 8, second column, line 32, for "positon" read position; line 38, for "manipulaitng" read manipulating; page 9, second column, line 69, claim 11, after the word "of" insert power operation of; page 11, first column, line 46, claim 23, strike out the word "irreversible"; and that the said Letters Patent should be read with this correction therein that the same may conform to the record of the case in the Patent Office.

Signed and sealed this 20th day of June, A. D. 1939.

Henry Van Arsdale (Seal)   Acting Commissioner of Patents.